No. 853,045. PATENTED MAY 7, 1907.
H. D. VAN DOORN.
HAND WINDLASS.
APPLICATION FILED APR. 25, 1906.
3 SHEETS—SHEET 1.
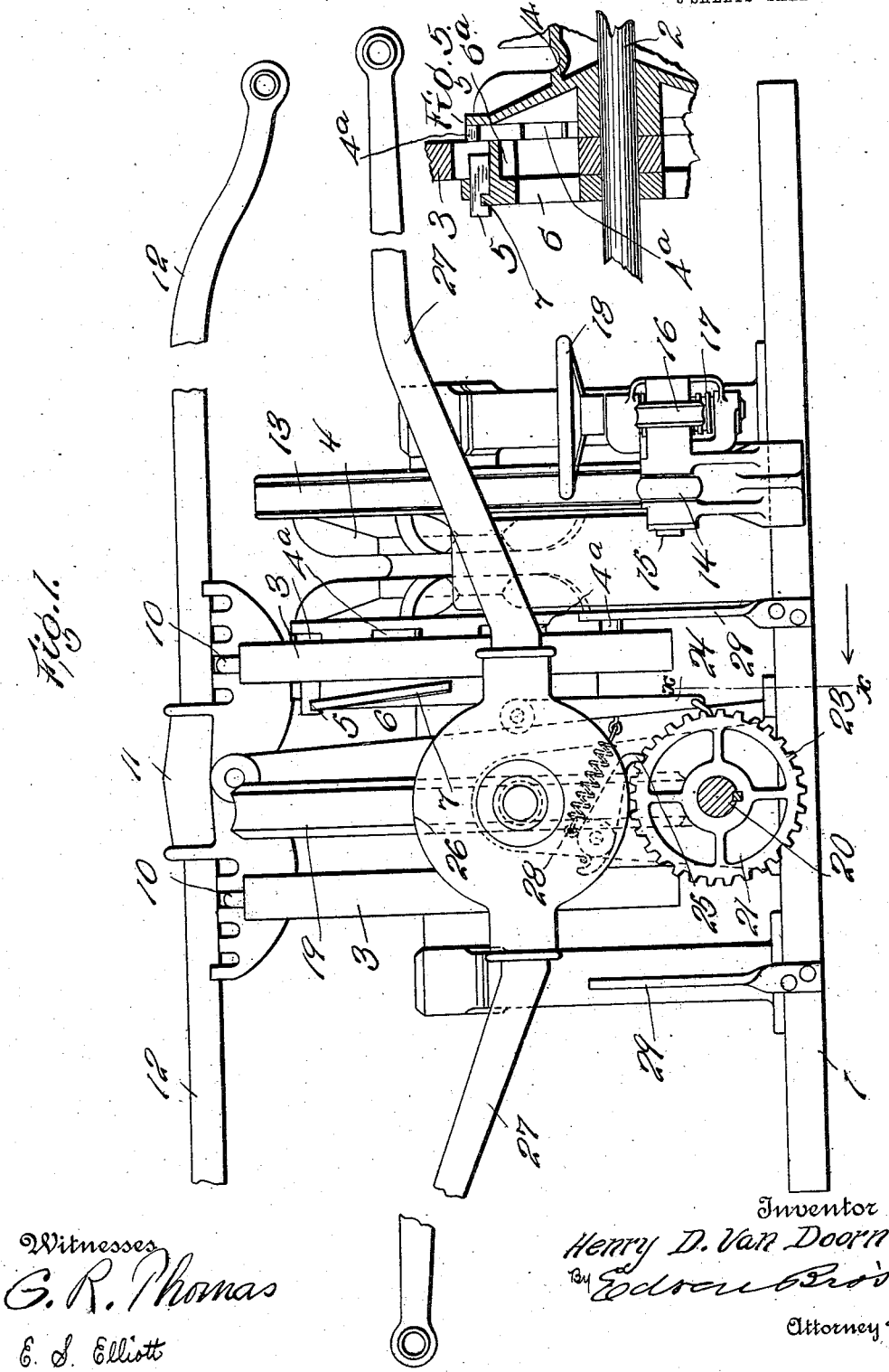
Witnesses
G. R. Thomas
E. S. Elliott
Inventor
Henry D. Van Doorn
By Edson Bros
Attorneys

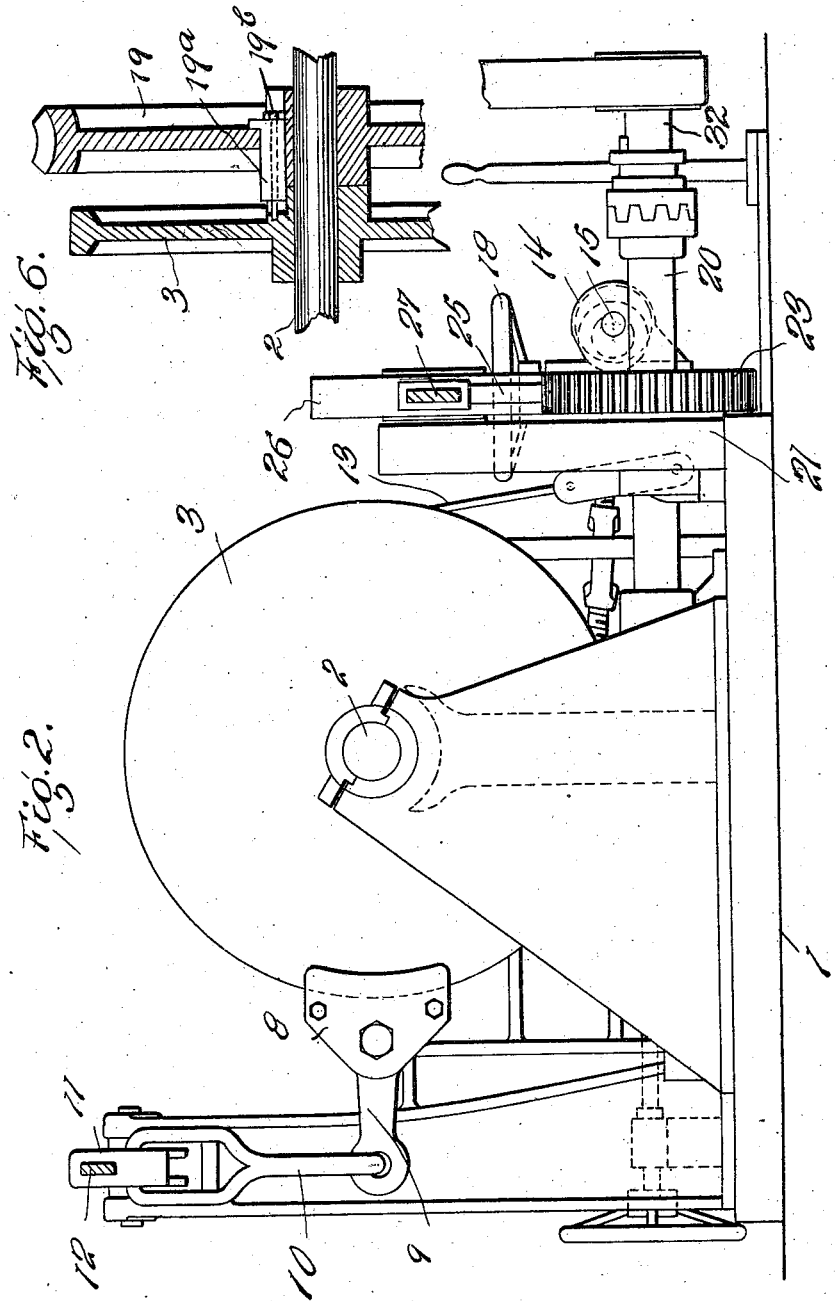

No. 853,045.
PATENTED MAY 7, 1907.
H. D. VAN DOORN.
HAND WINDLASS.
APPLICATION FILED APR. 25, 1906.
3 SHEETS—SHEET 3.
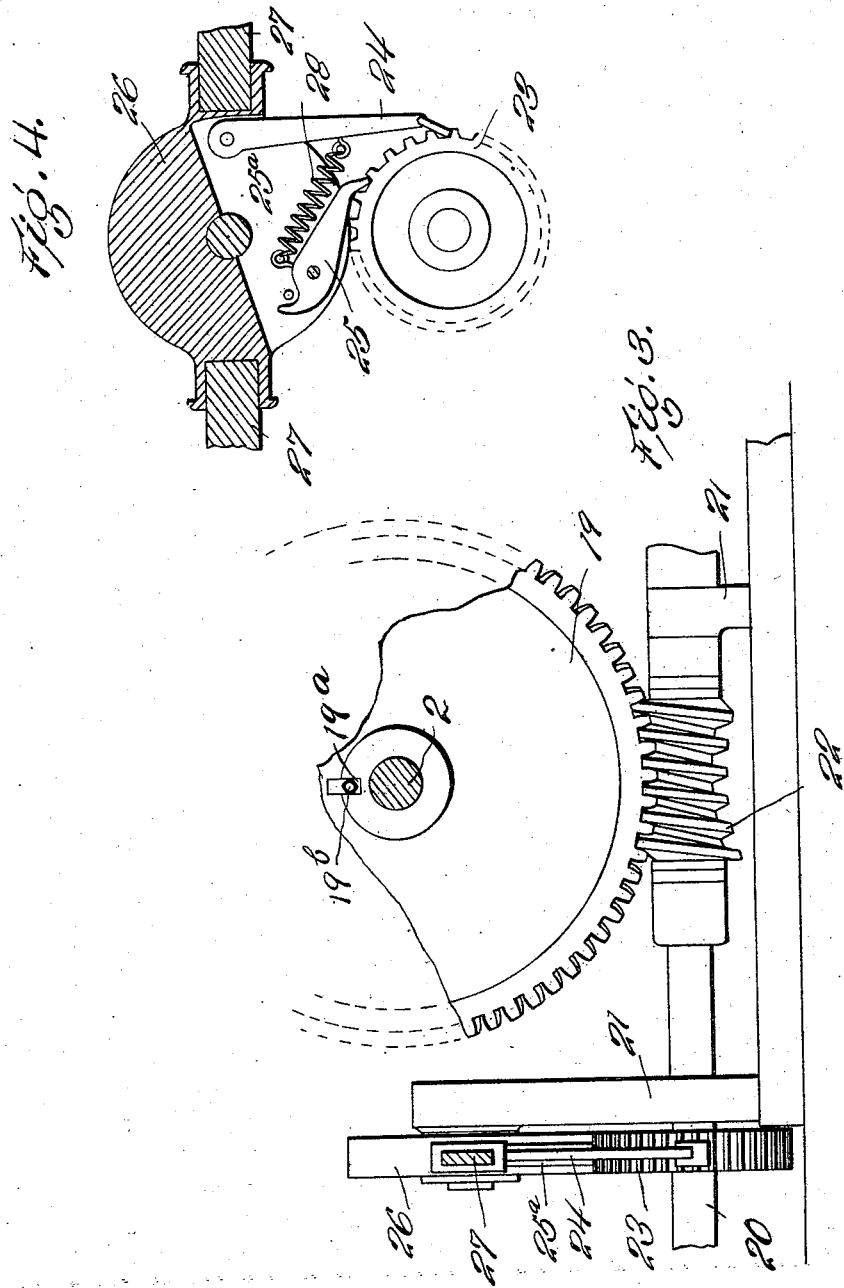
Witnesses
G. R. Thomas
E. S. Elliott
Inventor
Henry D. Van Doorn
By Edson Bros,
Attorneys

UNITED STATES PATENT OFFICE.

HENRY D. VAN DOORN, OF PROVIDENCE, RHODE ISLAND.

HAND-WINDLASS.

No. 853,045.  Specification of Letters Patent.  Patented May 7, 1907.

Application filed April 25, 1906. Serial No. 313,599.

*To all whom it may concern:*

Be it known that I, HENRY D. VAN DOORN, a citizen of the United States, residing at Providence, in the county of Providence and State of Rhode Island, have invented certain new and useful Improvements in Hand-Windlasses; and I do hereby declare the following to be a full, clear, and exact description of the invention, such as will enable others skilled in the art to which it appertains to make and use the same.

My invention relates to hand windlasses.

It has for its object to obtain the maximum power from a windlass operated by hand.

The invention consists of the features of construction and combinations of parts hereinafter described and more particularly pointed out in the claims concluding this specification.

In the accompanying drawings illustrating the preferred embodiment of my invention: Figure 1 is a side elevation of a windlass constructed in accordance with my invention, part of one arm of each pair of pump brakes being broken away. Fig. 2 is an end elevation of the machine. Fig. 3 is a broken sectional view taken on line x—x of Fig. 1 looking in the direction of the arrow. Fig. 4 is a broken sectional view of the pawl-carrying beam for actuating the worm shaft. Fig. 5 is a broken sectional view showing the mechanism for locking the wildcat to the pump brake wheel, and Fig. 6 is a broken sectional view showing the block key for locking the gear wheel to the pump brake wheels.

While I have shown the windlass equipped with only one wildcat, any number of wildcats may be used and other changes made without departing from my invention. I, therefore, reserve the right to make such changes from the construction shown and described herein, as the scope of the claims hereto appended will permit.

Referring more particularly to the drawings, in carrying out my invention, the whole windlass is mounted upon a bed plate 1 and comprises the main shaft 2 mounted in suitable bearings and carrying the pump brake wheels 3, 3 fast on said shaft and the wildcat 4 loosely mounted thereon. The wildcat may be locked to the pump brake wheel adjacent thereto by means of a block key 5 which is carried on a locking ring 6 loosely mounted on shaft 2. The locking ring 6 has a portion $6^a$ extending through an opening in the pump brake wheel upon which the key 5 rests, and is provided with a spiral rib 7 which extends through the key 5. By revolving the locking ring through a small angle the key is moved longitudinally until it engages notches $4^a$ arranged at intervals in the rim of the wildcat. The pump brake wheels are alternately revolved by means of clamps 8 carried by levers 9 connected by links 10 with the beam 11 which has oppositely extending hand pump brakes 12.

The wildcat is controlled by the friction band brake 13 one end of which encircles the eccentric 14 mounted on the shaft 15 upon which is also mounted the worm wheel 16 meshing with the worm 17 which is operated by the hand wheel 18. When the worm and worm wheel revolve the shaft 15, the eccentric tightens the friction band upon the wildcat.

The previously described apparatus is in accordance with previous practice in hand pump brake windlasses and the only way to increase the power of the windlass with this arrangement is to lengthen the pump brakes 12. In order to increase the power I have provided apparatus which I will now describe. A large gear wheel 19 is loosely mounted on the main shaft 2 between the pump brake wheels to one of which it is adapted to be connected up by means of a block key $19^a$ which is held in position by a bolt $19^b$ which passes completely through the block key and taps into the pump brake wheel 3 as shown in Fig. 6. When it is desired to disconnect the worm wheel from the pump brake wheel this block key is removed by hand. A transverse shaft 20 is hung in bearings 21 in the bed plate and carries a worm 22 meshing with the gear wheel 19. Said shaft 20 also carries a toothed wheel 23 keyed firmly to it. Said toothed wheel is driven by pawls 24 and 25 mounted within a slot $25^a$ in the beam 26 pivoted on the opposite side of the machine from the beam 11. Said beam 26 is operated by a pair of pump brakes 27 extending in opposite directions. If desired, the same pair of brakes may be used for operating both the beams 11 and 26 or separate pairs may be used so that both beams may be worked at the same time. The pawls 24 and 25 are pivoted near the edge of the beam but at points at opposite sides of the pivot of said beam and they extend in the same direction with relation to the toothed wheel so that no matter which way the pump brakes are working, whether up or down, motion will be imparted to the toothed wheel on each stroke. The coiled spring 28 is arranged between the pawls, as shown, in such a way that it will keep both pawls in contact with the toothed wheel at all times. The operation of the beam 26 revolves the shaft 20 by means of the toothed wheel keyed thereto and the turning of the worm on said shaft revolves the gear wheel 19 which, when keyed up with the pump brake wheel, causes it, the main shaft and the wildcat to revolve. It will be noted that owing to the introduction of the worm 22 and gear 19, much more power is obtained by operating the beam 26 than by working the beam 11. Stops 29 are provided to prevent the pump brakes 27 from being operated too far, which would cause the pawls to slip out of contact with the toothed wheel.

If it is desired to use the windlass for speed rather than power, the gear wheel 19 may be disconnected from the driving pump brake wheels 3 when the windlass can be operated by means of the pump brakes 12 as first described. Thus it will be seen that while this windlass has been especially designed to obtain the maximum amount of power, the features of the ordinary windlass have been retained, so that when the power is not required, the windlass can be changed to obtain less power and more speed.

While this invention relates primarily to means for operating windlasses to obtain increased power by hand, this hand-power arrangement of two sets of pump brakes can be used upon a windlass which is also driven by steam, electricity or otherwise by suitable connections to an extension 32 of the shaft 20 as shown in Fig. 2. Then, if the steam, electricity or other source of power should fail, the windlass may be disconnected from said motive power and operated as a hand windlass by means of the pump brakes.

I claim:

1. A hand windlass having a driven shaft carrying a wildcat, a rocking beam, a worm gear mounted on said shaft and operatively connected thereto, a driving shaft arranged transversely to the driven shaft and having connection with said beam whereby a rotary motion is imparted thereto by the actuation of said beam, said driving shaft carrying a worm meshing with said worm gear.

2. A hand windlass having a driven shaft carrying a wildcat, a rocking beam, a driving shaft arranged transversely to the driven shaft and carrying a toothed wheel, a pair of pawls on said rocking beam engaging said toothed wheel and adapted to impart a rotary motion thereto when said beam is actuated and a system of gearing between said driving shaft and driven shaft whereby an increased amount of power is obtained for the windlass.

3. A hand windlass having a driven shaft carrying a wildcat, a rocking beam, a driving shaft arranged transversely to the driven shaft and carrying a toothed wheel, a pair of pawls on said beam engaging said toothed wheel and adapted to impart a rotary motion thereto when said beam is actuated, a coiled spring arranged between said pawls and keeping them in contact with said toothed wheel, and a system of gearing between said driving shaft and driven shaft whereby an increased amount of power is obtained for the windlass.

4. A hand windlass, having a driven shaft carrying a wildcat, a rocking beam, a driving shaft arranged transversely to the driven shaft and carrying a toothed wheel, a pair of pawls on said beam engaging said toothed wheel and adapted to impart a rotary motion thereto when the beam is actuated, a worm on said driving shaft and a worm gear on the driven shaft meshing with said worm.

5. A hand windlass having a driven shaft carrying a wildcat, a rocking beam, a driving shaft arranged transversely to the driven shaft and carrying a toothed wheel, a pair of pawls pivoted on said beam at opposite sides of its pivotal point and extending in the same direction with relation to the periphery of the toothed wheel with which they engage, said pawls adapted to impart a rotary motion to said toothed wheel when said beam is actuated and a system of gearing between the driving shaft and the driven shaft.

6. A hand windlass having a wildcat operatively mounted, a rocking beam adapted to be connected up with said wildcat whereby it may be actuated to obtain increased speed and a second rocking beam also adapted to be connected up with said wildcat whereby it may be actuated to obtain increased power.

7. A hand windlass having a shaft carrying a wildcat, a pair of driving pump brake wheels on said shaft, a rocking beam for directly actuating said pump brake wheels, a second rocking beam, and a system of gearing between said second beam and the pump brake wheels whereby said wheels and the shaft may be actuated to obtain an increased amount of power when operated by said second beam over that attained when operated by the first mentioned beam.

8. A hand windlass having a driven shaft carrying a wildcat, a pair of driving pump brake wheels on said shaft, a rocking beam for directly actuating said pump brake wheels, a second rocking beam, a second shaft arranged transversely to the driven shaft, means carried by said second beam for imparting a rotary motion to said transverse shaft, a worm gear loosely mounted on said driven shaft but adapted to be keyed up with one of the pump brake wheels, and a worm on said transverse shaft meshing with said worm gear, whereby the wildcat may be actuated by the second beam to obtain increased power and by the first mentioned beam to obtain increased speed.

9. A windlass having a driven shaft carrying a wildcat, said shaft adapted to be connected up with a source of motive power, a hand operated rocking beam for actuating said shaft, and a system of gearing between said beam and shaft for the purpose specified.

10. A windlass having a wildcat operatively mounted and adapted to be connected up with a source of motive power, a hand operated rocking beam adapted to be connected up with said wildcat and a second hand operated rocking beam adapted to be connected up with said wildcat through a series of gears whereby said wildcat may be operated to obtain greater power than when actuated by the first-mentioned rocking beam.

In testimony whereof, I affix my signature, in presence of two witnesses

HENRY D. VAN DOORN.

Witnesses:
GILMAN E. JOPP,
GEORGE L. GRAHAM.